US 8,498,019 B2

(12) United States Patent
Choi (10) Patent No.: US 8,498,019 B2
(45) Date of Patent: Jul. 30, 2013

(54) IMAGE FORMING APPARATUS THAT EMPHASIZES A BOUNDARY BETWEEN TWO OBJECTS USING A HALFTONING PROCESS

(75) Inventor: Woo-ri Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 506 days.

(21) Appl. No.: 12/566,100

(22) Filed: Sep. 24, 2009

(65) Prior Publication Data

US 2010/0073699 A1 Mar. 25, 2010

(30) Foreign Application Priority Data

Sep. 25, 2008 (KR) .................. 10-2008-0094366

(51) Int. Cl.
*H04N 1/405* (2006.01)

(52) U.S. Cl.
USPC ............ 358/3.06; 358/1.9; 358/3.2; 358/533; 358/536; 382/263; 382/264; 382/266; 382/269; 382/173

(58) Field of Classification Search
None
See application file for complete search history.

(56) References Cited

U.S. PATENT DOCUMENTS

| 6,104,502 | A  | * | 8/2000  | Shiomi          | 358/1.9  |
|-----------|-----|---|---------|-----------------|----------|
| 6,760,126 | B1 | * | 7/2004  | Kritayakirana et al. | 358/2.1 |
| 7,880,927 | B2 |   | 2/2011  | Usui et al.     |          |
| 2002/0008879 | A1 | * | 1/2002 | Morimatsu      | 358/1.9  |
| 2005/0078867 | A1 | * | 4/2005 | Kanno          | 382/163  |
| 2005/0274263 | A1 | * | 12/2005 | Ghislain      | 99/372   |
| 2005/0286066 | A1 | * | 12/2005 | Hirano         | 358/1.13 |
| 2006/0023258 | A1 | * | 2/2006 | Loce et al.    | 358/3.2  |
| 2006/0087694 | A1 | * | 4/2006 | Purdum et al.  | 358/3.2  |
| 2008/0260284 | A1 | * | 10/2008 | Lin et al.    | 382/266  |

FOREIGN PATENT DOCUMENTS

| JP | 2008-66895       | 3/2008 |
|----|------------------|--------|
| KR | 10-2006-0028600  | 3/2006 |

OTHER PUBLICATIONS

Korean Office Action mailed Mar. 28, 2013 in corresponding Korean Application No. 10-2008-0094336.

* cited by examiner

*Primary Examiner* — Miya J Cato
(74) *Attorney, Agent, or Firm* — Staas & Halsey LLP (57) ABSTRACT

An image forming apparatus capable of reducing a stitch effect, an image forming system including the same, and a printing method thereof. The printing method of the image forming system includes inputting image data to be printed; and, if adjacent first and second objects included in the input image data have different LPIs (Lines Per Inch), emphasizing at least one of boundaries of the first and second objects and printing the image data with an emphasized boundary.

20 Claims, 7 Drawing Sheets

IMAGE FORMING APPARATUS THAT EMPHASIZES A BOUNDARY BETWEEN TWO OBJECTS USING A HALFTONING PROCESS

CROSS-REFERENCE TO RELATED APPLICATION

This application claims priority from Korean Patent Application No. 2008-94336, filed on Sep. 25, 2008 in the Korean Intellectual Property Office, the disclosure of which is incorporated herein by reference.

BACKGROUND OF THE INVENTION

1. Field of the Invention

Methods and devices consistent with aspects of the present invention relate to an image forming apparatus, an image forming system including the same, and a printing method thereof, and more particularly, to an image forming apparatus with improved image quality, an image forming system including the same, and a printing method thereof.

2. Description of the Related Art

An image forming apparatus is an apparatus which prints image data output from a host device, such as a computer, a personal digital assistant (PDA) or the like, on a print medium, including a printer, a multifunction copier or the like.

Each of the pixels included in the image data has 8 bits for each of three RGB (red, green and blue) colors, that is, gray scale values between 0 and 255. However, in order to represent the pixel by dots, the 8-bit gray scale values are required to be converted into 1-bit (0 and 1) binary gray scale values. Such a series of conversion processes is referred to as "halftoning."

In such a halftoning process, in some cases, different LPIs (Lines Per Inch) may be applied to different objects, such as a text, an image (a photograph, a picture, etc.), a graphic (a background of a text, a chart, etc.), included in the image data for improvement of image quality. In addition to the halftoning process, an emphasis process is performed for a boundary of a text included in the image data, through which a clearer image is obtained when the text is printed.

Figure 1:
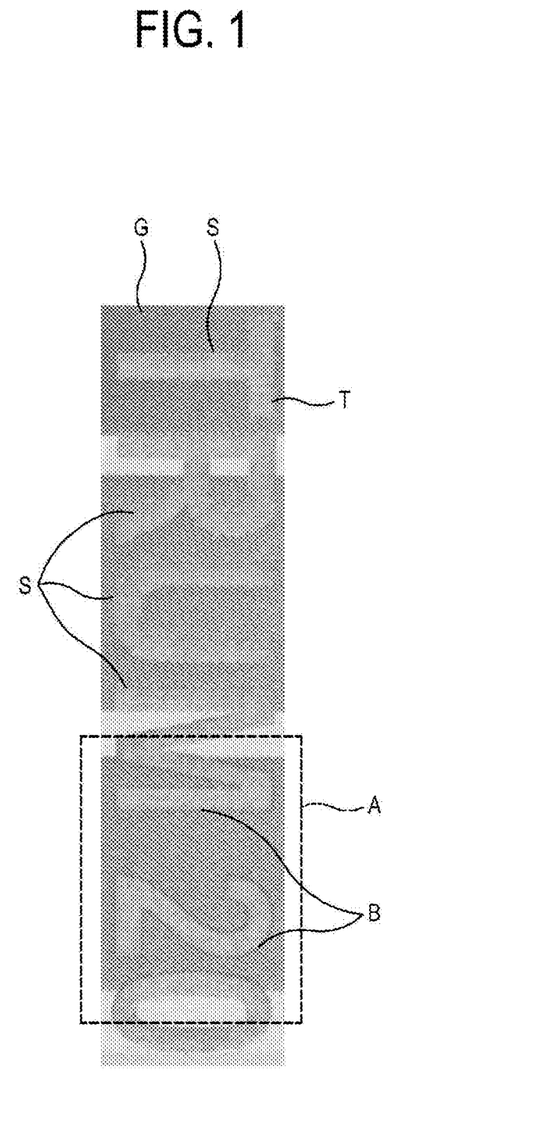
FIG. 1 is a view showing an example of a print result by a conventional image forming apparatus.

However, for example, where image data including a text (T) such as, "TRUM20" which is printed in a pink color, and a graphic (G) which is printed in gray, blue and pink colors in that order, and which is a background of the text (T), is subjected to halftoning and boundary emphasis processes, the image data may be printed as shown in FIG. 1. FIG. 1 shows a captured image obtained through a simulation of a print result.

As shown in FIG. 1, a defect in image quality such as sewing (which is called 'stitch effect') is produced in boundary portions (S) between the text (T) and the graphic (G) having different LPIs.

In addition, as can be seen in a region A of FIG. 1, if the text (a portion of "M", "2" and a portion of "0") and the graphic which is the background of the text have the same pink color, boundaries (B) of the text (the portion of "M", "2" and the portion of "0") are emphasized. This implies that the boundary of the text (T) is not properly detected since the text (T) has a different color from the graphic (G) which is in the background of the text (T) except in the region A. Conventional boundary detection algorithms provide low reliability of boundary detection since they detect boundaries based on change in gradation of color or gray (change in brightness).

SUMMARY OF THE INVENTION

Accordingly, it is an aspect of the present invention to provide an image forming apparatus which is capable of reducing the above-mentioned stitch effect, an image forming system including the same, and a printing method thereof.

Another aspect of the present invention is to provide an image forming apparatus which is capable of more reliably detecting a boundary between objects included in image data, an image forming system including the same, and a printing method thereof.

Still another aspect of the present invention is to provide an image forming apparatus which is capable of improving image quality, an image forming system including the same, and a printing method thereof.

Additional aspects of the present invention will be set forth in part in the description which follows and, in part, will be obvious from the description, or may be learned by practice of the present invention.

The foregoing and/or other aspects of the present invention can be achieved by providing a printing method of an image forming system, including: inputting image data to be printed; and, if adjacent first and second objects included in the input image data are halftone-processed such that the first and the second objects have different halftone property, performing an emphasis process on at least one of boundaries of the first and second objects and printing the image data with emphasized boundary.

According to an aspect of the invention, the halftone property may comprise at least one of LPIs (Lines Per Inch) and angle of the Lines.

According to an aspect of the invention, the printing method further includes: if adjacent pixels of the input image data belong to the first and second objects, respectively, detecting the adjacent pixels as boundaries of the first and second objects.

According to an aspect of the invention, the first object is a text type and the second object is a graphic type.

According to an aspect of the invention, a concentration of at least one of the detected boundaries of the first and second objects is higher than an internal concentration of one of the first and second objects.

According to an aspect of the invention, a difference between the boundary concentration and the internal concentration increases as a difference in LPI between the first and second objects increases.

According to an aspect of the invention, a difference between the boundary concentration of one having a smaller LPI of the first and second objects and the internal concentration is larger than a difference between the boundary concentration of one having a larger LPI of the first and second objects and the internal concentration.

According to an aspect of the invention, the printing method further includes: if LPIs (Lines Per Inch) of the first and second objects are equal to each other, printing the image data without performing a boundary emphasis process for the first and second objects.

The foregoing and/or other aspects of the present invention can be achieved by providing a printing method of an image forming system, including: inputting image data to be printed; if adjacent pixels of the input image data belong to first and second objects, respectively, detecting the adjacent pixels as boundaries of the first and second objects; emphasizing the detected boundaries of at least one of the first and second objects; and printing the image data with emphasized boundaries.

The foregoing and/or other aspects of the present invention can be achieved by providing an image forming apparatus including: a data input unit that receives image data to be printed; a printing unit that prints the image data on a print medium; and a controller that, if first and second objects included in the received image data are halftone-processed such that the first and the second objects have different halftone property, controls an image processing unit to emphasize at least one of boundaries of the first and second objects and controls the printing unit to print the image data with emphasized boundaries.

According to an aspect of the invention, if adjacent pixels of the received image data belong to the first and second objects, respectively, the controller detects the adjacent pixels as boundaries of the first and second objects.

According to an aspect of the invention, the first object is a text type and the second object is a graphic type.

According to an aspect of the invention, a concentration of at least one of the detected boundaries of the first and second objects is higher than an internal concentration.

According to an aspect of the invention, a difference between the boundary concentration and the internal concentration increases as a difference in LPI between the first and second objects increases.

According to an aspect of the invention, a difference between the boundary concentration of one having a smaller LPI of the first and second objects and the internal concentration is larger than a difference between the boundary concentration of one having a larger LPI of the first and second objects and the internal concentration.

According to an aspect of the invention, if LPIs (Lines Per Inch) of the first and second objects are equal to each other, the controller controls the printing unit to print the image data without performing a boundary emphasis process for the first and second objects.

The foregoing and/or other aspects of the present invention can be achieved by providing an image forming system including a host device and an image forming apparatus operable to communicate with the host device, wherein, if first and second objects included in image data to be printed have different LPIs (Lines Per Inch), the host device emphasizes at least one of boundaries of the first and second objects and transmits the image data with emphasized boundary to the image forming apparatus, and the image forming apparatus prints the image data transmitted from the host device.

According to an aspect of the invention, if adjacent pixels of the image data belong to the first and second objects, respectively, the host device detects the adjacent pixels as boundaries of the first and second objects.

According to an aspect of the invention, the host device emphasizes at least one of the boundaries of the first and second objects such that a concentration of the at least one of the detected boundaries of the first and second objects is higher than an internal concentration.

According to an aspect of the invention, the host device emphasizes at least one of the boundaries of the first and second objects such that a difference between the boundary concentration and the internal concentration increases as a difference in LPI between the first and second objects increases.

According to an aspect of the invention, the host device emphasizes at least one of the boundaries of the first and second objects such that a difference between the boundary concentration of one having a smaller LPI of the first and second objects and the internal concentration is larger than a difference between the boundary concentration of one having a larger LPI of the first and second objects and the internal concentration.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures. The various aspects of the present invention are not limited to exemplary embodiments disclosed herein but may be implemented in different forms.

In the following embodiments, for the purpose of clarity, the same components are denoted by the same reference numerals throughout the drawings, and explanation thereof will be representatively given in a first embodiment but will be omitted in other embodiments.

Figure 2:
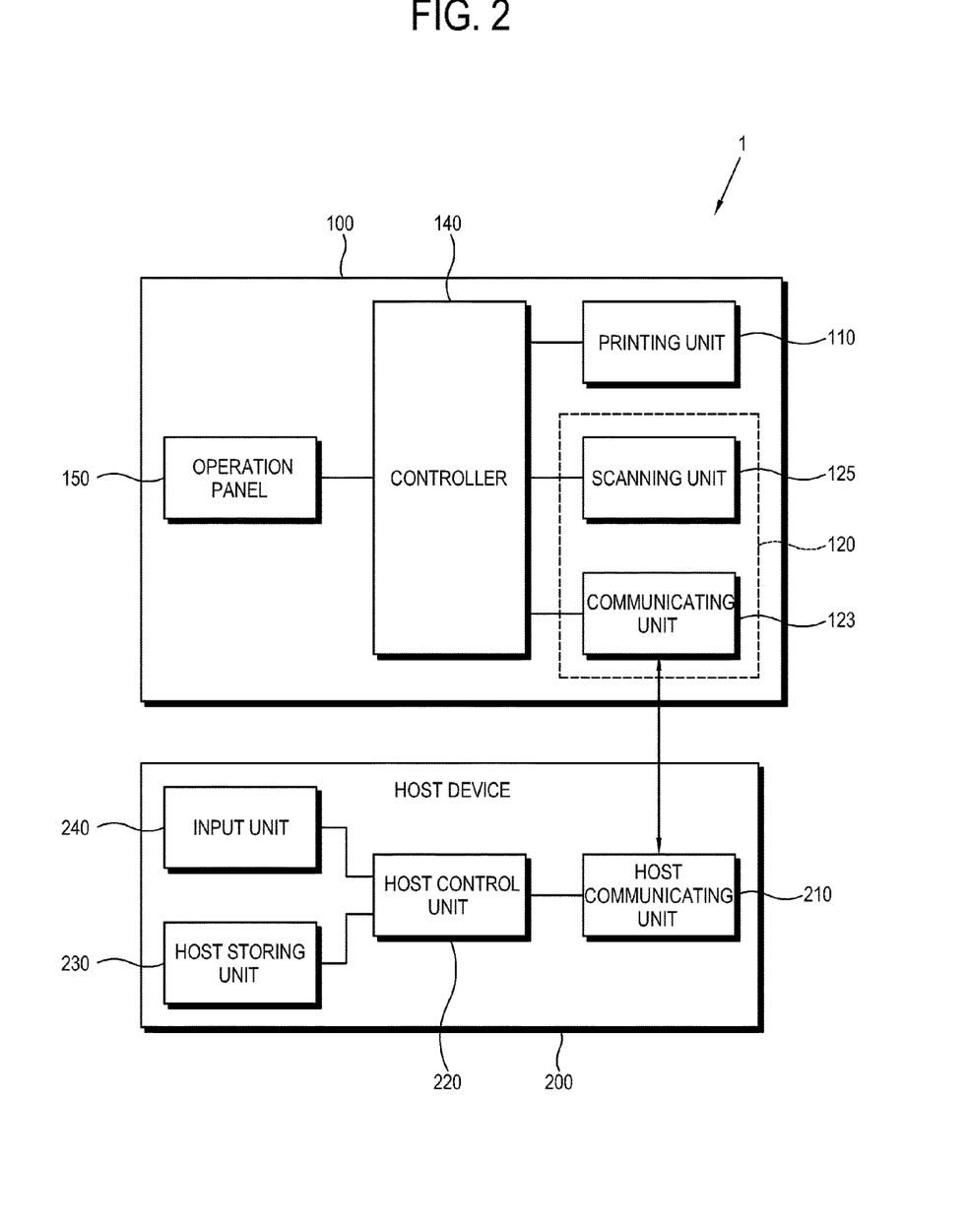
FIG. 2 is a block diagram of an image forming system according to an exemplary embodiment of the invention.

As shown in FIG. 2, an image forming system 1 according to an exemplary embodiment of the invention includes an image forming apparatus 100 and a host device 200 which is connected to and communicates with the image forming apparatus 100.

The host device 200 includes an input unit 240, a host communicating unit 210 for transmitting image data to be printed to the image forming apparatus 100, a host storing unit 230 for storing the image data, and a host control unit 220 for controlling the host device 200 as a whole.

The input unit 240 may include one of a keyboard, a mouse and a touch pad. Alternatively, other known types of inputs may be employed.

The host communicating unit 210 may include at least one of a serial port, a parallel port, a universal serial bus (USB) port and a network interface card accessible to the Internet.

An operating system (OS) program and application programs such as a word processor may be stored in the host storing unit 230.

Upon receiving a request for print of the image data through the input unit 240, the host control unit 220 controls the host communicating unit 210 to transmit the image data to the image forming apparatus 100.

Here, the image data may include a document created by an application program stored in the host storing unit 230. In addition, the image data includes a plurality of objects such as images (photographs, pictures and so on), texts and graphics (charts and background colors of texts). Although the type of object is divided into an image, a text and a graphic, the type of object may be divided in more detail or differently.

Here, the image data may be color data having gray scale values of three RGB (red, green and blue) colors and has tag information indicating which type of object to correspond to each pixel.

The image forming apparatus 100 includes a data input unit 120 which receives image data to be printed from the host device 200, a printing unit 110 which prints the image data on a print medium, and a controller 140 which controls the data input unit 120 and the printing unit 110.

The data input unit 120 may include a communicating unit 123. The communicating unit 123 may include at least one of a serial port, a parallel port, a USB port and a network interface card accessible to the Internet. Of course, the communicating unit 123 may employ a variety of data transmission systems which can communicate with the host device 200.

The printing unit 110 may employ at least one of an electrophotographic system which forms an image on a print medium through a series of processes including charging-exposing-developing-transferring-cleaning, an inkjet system which forms an image on a print medium by forming ink dots on the print medium by discharging ink through nozzles, and a dye sublimation system which forms an image on thermosensitive paper using a thermal print head (TPH).

The controller 140 compares LPIs (Lines Per Inch) between adjacent objects included in the received image data to determine whether or not boundaries of the objects are to be emphasized, and based on a result of the comparison, controls the printing unit 110 to print the image data with the boundaries emphasized.

Here, an LPI (Lines Per Inch) implies how many dot lines exist in the unitary inch, which is the unit of resolution of a halftoning image halftoned when each pixel of the image data with the continuous gray scales is halftoned. Here, a concentration refers to a ratio of dots actually applied with a developer with respect to the entire dots which may be represented on the basis of the same area. A higher concentration provides a higher saturation for a color image and a lower brightness for a monochrome image. For example, a concentration of 100% refers to a developer that is applied to all of the dots in the same area, thus providing a 100% black image for a black developer, for example, and a concentration of 0% refers to a developer that is applied to none of the dots in the same area.

One of an error diffusion method and a screening method may be used for the halftoning. It is not always until the object is halftoned that an LPI of each of objects included in the received image data can be known. Rather, if a halftoning method to be used is determined, an LPI of a halftoned image may be estimated even before the image is halftoned.

The controller 140 determines whether or not LPIs of adjacent first and second objects in the received image data are different from each other. If it is determined that the LPIs are different from each other, the controller 140 emphasizes at least one of the boundaries of the first and second object.

Thus, as a concentration of the boundary portion is emphasized, it is possible to prevent the above-mentioned stitch effect from being produced.

While it is described that the controller 140 of the image forming apparatus 100 performs the above-described boundary emphasis process, the host control unit 220 of the host device 200 may perform the boundary emphasis process in some cases. More specifically, if the LPIs (Lines Per Inch) of the first and second objects included in the image data requested to be printed through the input unit 240 are different from each other, the host control unit 220 of the host device 200 may emphasize the boundary between the first object and the second object and transmit the image data with the emphasized boundary to the image forming apparatus 100. The image forming apparatus 100 may receive the image data with the emphasized boundary and print the image data on a print medium.

Here, if adjacent pixels of the received image data belong to the first and second objects, respectively, the controller 140 may detect the adjacent pixels as respective boundaries of the first and second objects.

For example, if it is determined from tag information of adjacent first and second pixels that the first pixel is a text object and the second pixel is a graphic object, the controller 140 may detect the first and second pixels as respective boundaries of the text object and the graphic object. Accordingly, it is possible to detect boundaries of objects more reliably than detecting the boundaries based on change in gray scales (brightness) as in the conventional art.

The controller 140 emphasizes at least one of the boundaries of the first object and the second object by increasing a concentration of at least one of the detected boundaries of the first object and the second object over an internal concentration within the boundary of any of the objects.

Here, the internal concentration refers to a concentration within the boundary of the first object except the detected boundary.

For example, if a gray scale of a pixel corresponding to the boundary of the first object is 100 (in this example, 250 corresponding to brightness 0% (black) and 0 corresponding to brightness 100% (white)), the gray scale of the boundary pixel may be changed to 150 which is larger than 100. Here, both or only one of the boundaries of the first and second objects may be emphasized.

In addition, the controller 140 may emphasize at least one of the boundaries of the first and second objects such that a difference between the boundary concentration and the internal concentration is proportional to a difference in LPI between the first and second object.

In more detail, assuming that L1 and L2 represent respective LPIs of the first and second objects, D1 and D2 represent respective internal concentrations within the boundaries of the first and second objects, and ED1 and ED2 represent respective boundary concentrations of the first and second objects, ED1 and ED2 can be set according to the following Equations 1 and 2.

$$ED1 = D1 + \alpha |L1 - L2| \qquad \text{[Equation 1]}$$

$$ED2 = D2 + \beta |L1 - L2| \qquad \text{[Equation 2]}$$

Where, $\alpha$ and $\beta$ in Equations 1 and 2 are positive values.

In addition, if LPI of the first object is larger than LPI of the second object (i.e., L1>L2), $\beta$ may be larger than $\alpha$. This indicates that the boundary concentration of an object having a smaller LPI becomes higher than the boundary concentration of an object having a larger LPI. Accordingly, it is possible to more reliably prevent the above-mentioned stitch effect from being produced by making the boundary concentration of the object having the smaller LPI relatively high.

In addition, as can be seen from Equations 1 and 2, the larger the difference in LPI between the first and second objects, the larger the difference between the boundary concentration and the internal concentration. In some cases, the difference between the boundary concentration and the internal concentration of the object may be proportional to the difference in LPI between the first and second objects. In other cases, the difference between the boundary concentration and the internal concentration of the object may not be proportional to the difference in LPI between the first and second objects, unlike Equations 1 and 2. Namely, it is sufficient only if the boundary concentration of the object is higher than the internal concentration of the object.

In addition, it can be seen from Equations 1 and 2 that the difference between the boundary concentration and the internal concentration of one of the objects having a smaller LPI of the first and second objects is larger than the difference between the boundary concentration and the internal concentration of another one of the objects having a larger LPI of the first and second objects. This indicates that it is possible to more effectively prevent the above-mentioned stitch effect from being produced by emphasizing the boundary of the object having the smaller LPI more intensively than the boundary of the object having the larger LPI because the smaller LPI is more likely to produce the stitch effect.

In the meantime, if the LPIs of the first and second objects of the image data received from the host device 200 are equal to each other, the controller 140 may control the printing unit 110 to print the image data with no emphasis placed on the boundaries of the first and second objects. If LPIs of adjacent objects are equal to each other, since the above-mentioned stitch effect can not be observed by naked eyes, it is possible to print image data without requiring a boundary emphasis process.

In addition, as shown in FIG. 2, the image forming apparatus 100 may additionally include a scanning unit 125 to scan an image recorded on a manuscript and an operation panel 150 to allow a user to operate the image forming apparatus 100.

While it has been described above that the image data is transmitted from the host device 200 to the image forming apparatus 100 via the communicating unit 123, data scanned by the scanning unit 125 may be the image data. That is, the data input unit 120 may include the scanning unit 125. The image data may be generated in the image forming apparatus 100 through the scanning unit 125 without being received from the external host device 200.

Figure 3A:
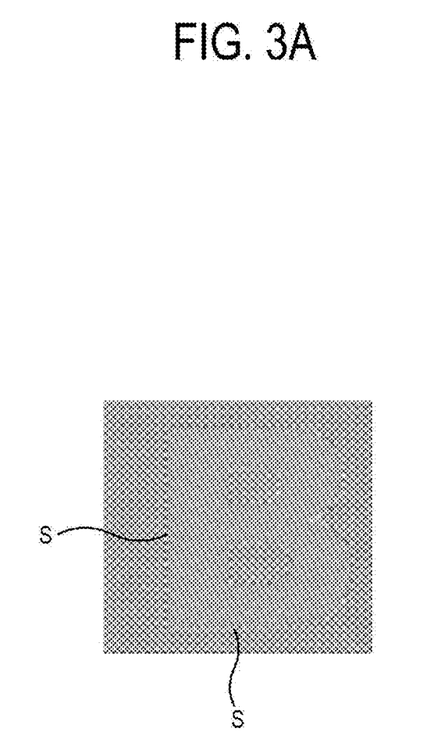
FIG. 3A is a view showing an example of a print result by a conventional image forming apparatus.
Figure 3B:
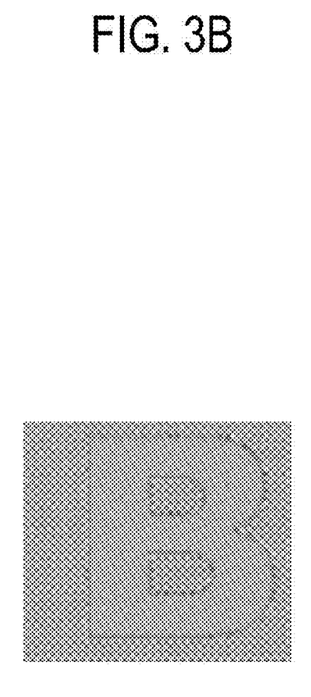
FIG. 3B is a view showing an example of a print result produced when the image forming apparatus of FIG. 2 outputs the same image data as FIG. 3A.

FIG. 3A shows a result of simulation by a conventional image forming system on image data including a text "B" in sky blue and a graphic in pink, and FIG. 3B shows a result of simulation by the image forming system 1 according to an aspect of the invention on the same image data as FIG. 3A.

As can be seen from both figures, while the above-mentioned stitch effect is found in a boundary portion S of the text "B" in FIG. 3A, the stitch effect is not found in FIG. 3B since the boundary of the text "B" is emphasized. In addition, it can be seen that, while an image of the boundary portion of the text "B" is unclear in FIG. 3A since the boundary of the text "B" can not be detected and hence cannot be emphasized, a clearer image can be obtained in FIG. 3B since the boundary portion of the text "B" is surely emphasized.

Hereinafter, exemplary printing methods of the image forming system of the invention will be described with reference to FIG. 2 and FIGS. 4 to 6.

Figure 4:
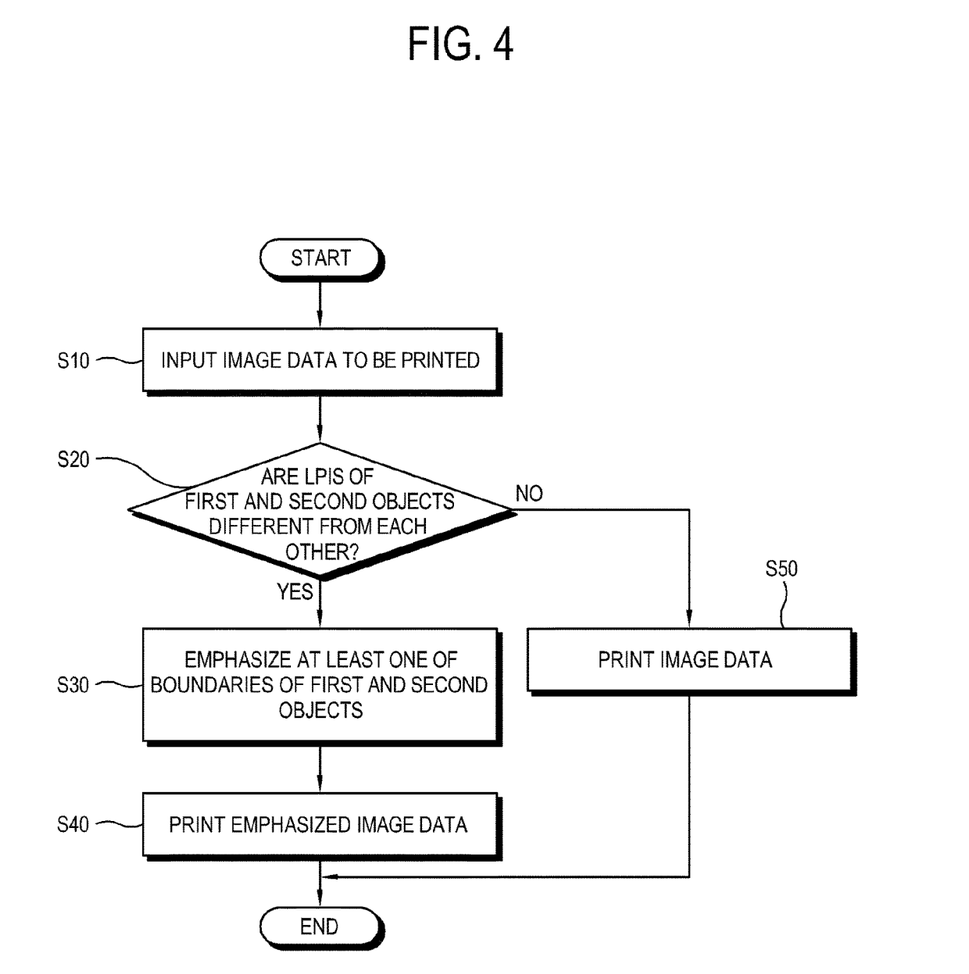
FIG. 4 is a flow chart of a printing method of an image forming system according to an embodiment of the invention.

In a printing method of the image forming system in accordance with a first embodiment of the invention, image data to be printed is first input (S10), as shown in FIGS. 2 and 4. Here, the image data may be input to the image forming apparatus 100 by being received from the external host device 200 connected to the image forming apparatus 100 of the image forming system 1 or by being generated in the image forming apparatus 100 by scanning a manuscript using the scanning unit 125 of the image forming apparatus 100.

Next, it is determined whether or not LPIs of adjacent first and second objects included in the input image data are different from each other (S20).

If it is determined that the LPIs of the first and second objects are different from each other (YES in S20), at least one of boundaries of the first and second objects is emphasized (S30). Here, while the boundary may be emphasized by making a boundary concentration higher than an internal concentration as described above, any known boundary emphasis method may be employed.

Next, the emphasized image data is printed (S40).

If the LPIs of the first and second objects are equal to each other (NO in S20), the input image data is printed without the boundaries of the first and second objects being emphasized (S50).

Figure 5:
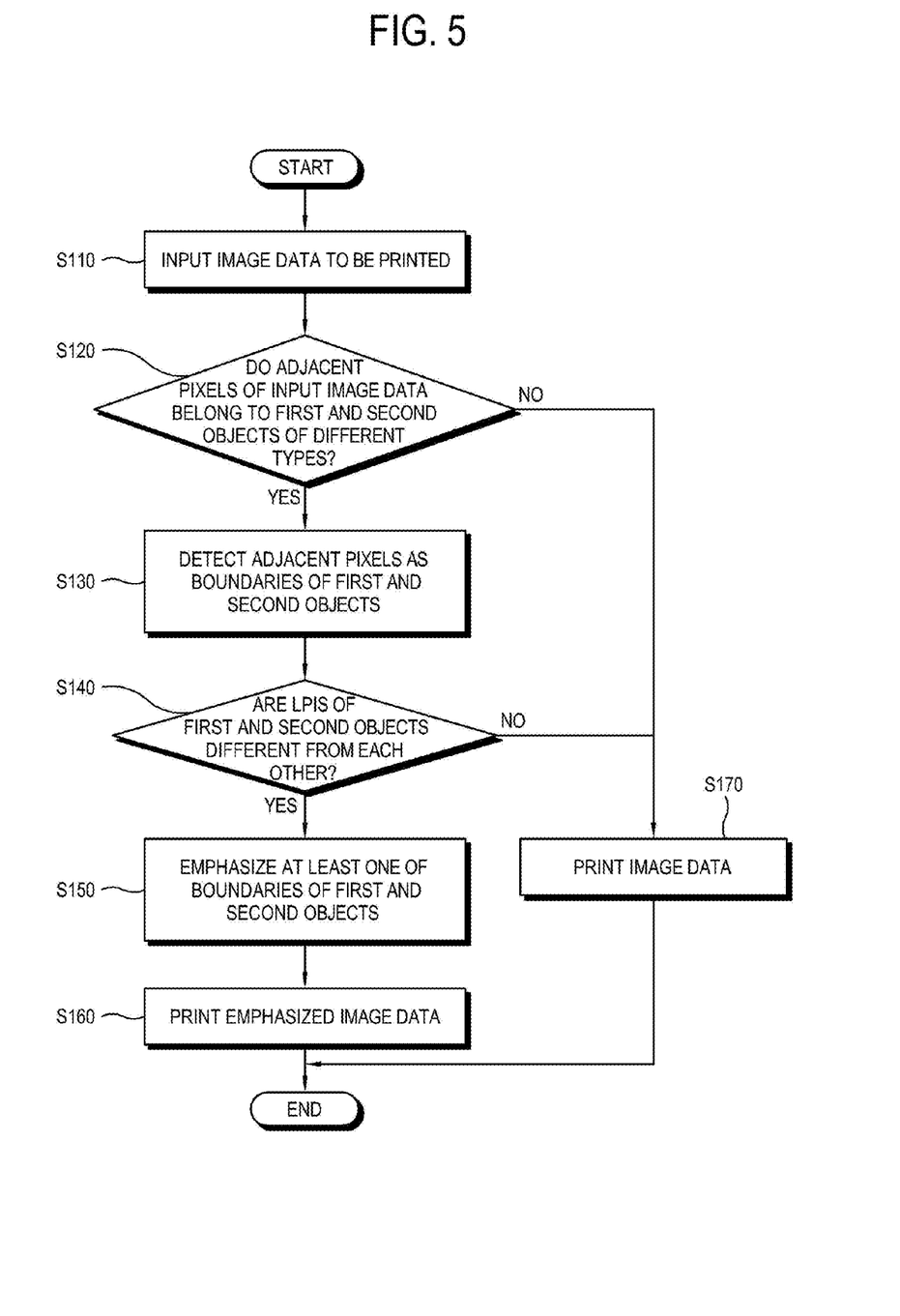
FIG. 5 is a flow chart of a printing method of an image forming system according to another embodiment of the invention.

In a printing method of the image forming system in accordance with a second embodiment of the invention, image data to be printed is first input (S110), as shown in FIG. 5.

Next, it is determined whether or not adjacent pixels of the input image data belong to first and second objects of different types (S120). The adjacent pixels belonging to the objects of different types may be found using tag information indicating which object corresponds to each pixel of the image data.

If it is determined that the adjacent pixels belong to the objects of different types (YES in S120), the adjacent pixels are detected as boundaries of the first and second objects (S130). Here, if only one of the boundaries of the first and second objects is to be emphasized as in S150, which will be described later, only the boundary of an object to be emphasized may be detected.

If it is determined that the adjacent pixels do not belong to the objects of different types (NO in S120), the input image data is considered to be a single object and thus is printed without performing a boundary emphasis process for the object (S170).

After detecting the boundaries, it is determined whether or not LPIs of the first and second objects are different from each other (S140).

If it is determined that the LPIs of the first and second objects are different from each other (YES in S140), at least one of the detected boundaries of the first and second objects is emphasized (S150).

Next, the boundary-emphasized image data is printed (S160).

If the LPIs of the first and second objects are equal to each other (NO in S140), the input image data is printed without the boundaries of the first and second objects being emphasized (S170).

Figure 6:
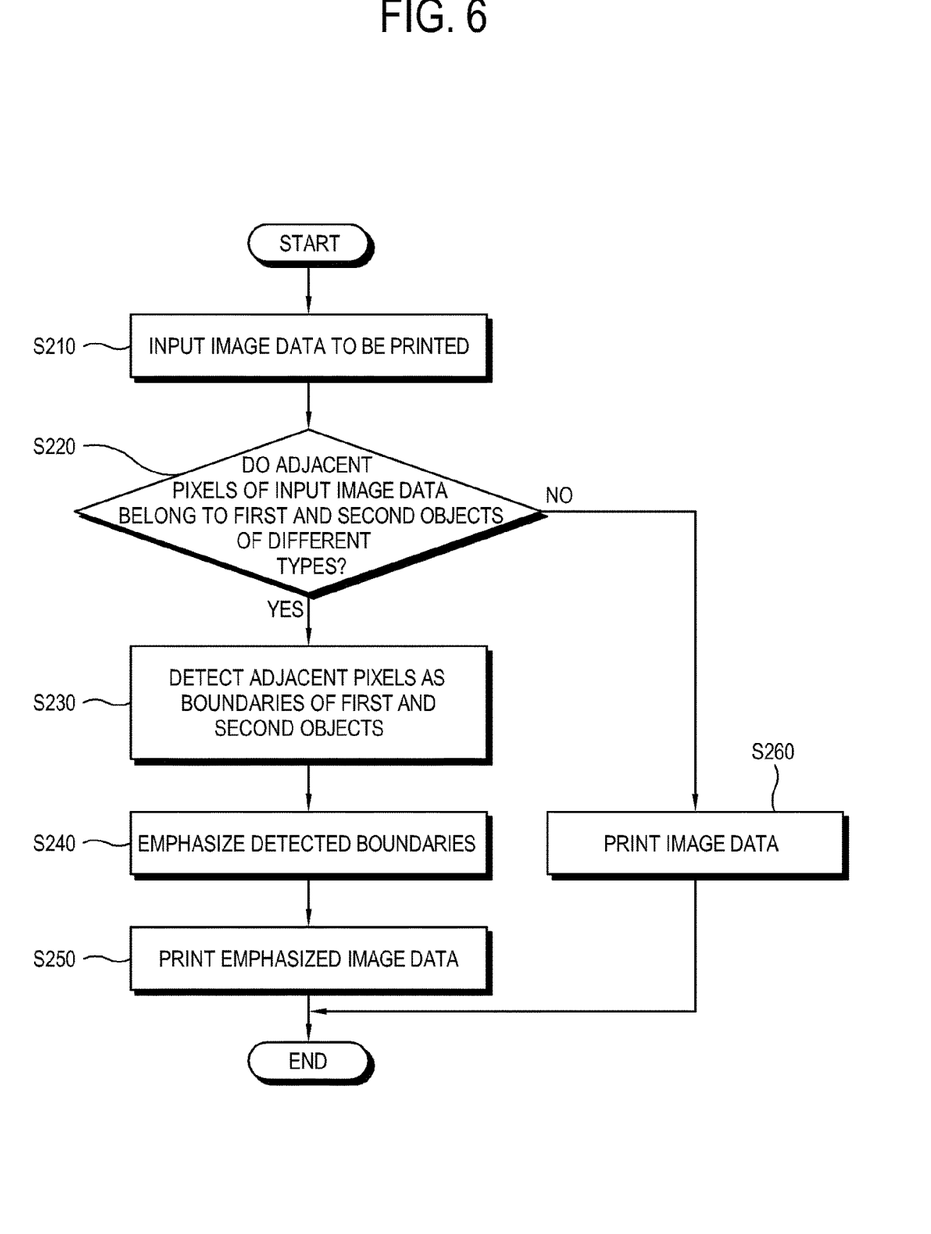
FIG. 6 is a flow chart of a printing method of an image forming system according to another embodiment of the invention.

In a printing method of the image forming system in accordance with a third embodiment of the invention, image data to be printed is first input (S210), as shown in FIG. 6.

Next, it is determined whether or not adjacent pixels of the input image data belong to first and second objects of different types (S220).

If it is determined that the adjacent pixels belong to the objects of different types (YES in S220), the adjacent pixels are detected as boundaries of the first and second objects (S230). While reliability is deteriorated if the boundaries are detected based on change in brightness (gray scales) in the conventional art, this embodiment provides even higher reliability of boundary detection by detecting the boundaries based on tag information included in the image data.

Next, the detected boundaries are emphasized (S240). Here, both of the detected boundaries may be emphasized. Here, the boundaries may be emphasized by making a boundary concentration higher than an internal concentration as described above. In other cases, any known boundary emphasis method may be employed.

Next, the emphasized image data is printed (S250).

On the other hand, if it is determined that the adjacent pixels do not belong to the first and second objects of different types (NO in S220), the input image data is printed (S260). In this case, since the image data is considered to be an object of a single type and thus is printed without performing a boundary emphasis process for the object.

As described above, according to aspects of the present invention, the image forming apparatus, the image forming system including the same, and the printing method thereof have the following and/or other advantages.

First, it is possible to prevent a stitch effect from being produced in a boundary of an object.

Second, it is possible to more reliably detect a boundary between objects included in image data.

Third, it is possible to improve image quality by surely emphasizing a boundary of an object. In particular, if the object is a text, it is possible to improve discrimination of the text.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A printing method of an image forming system, comprising:
   inputting image data to be printed;
   if adjacent first and second objects included in the input image data are halftone-processed such that the first and second objects have different halftone property, performing an emphasis process on at least one of boundaries of the first and second objects and printing the image data with an emphasized boundary; and
   wherein the halftone property comprises LPIs (Lines Per Inch);
   wherein the adjacent first and second objects is determined to have different halftone property by comparing the boundary concentration of one of the first and second objects with the internal concentration of one of the first and second objects; and
   wherein the emphasis process on at least one boundaries of the first and second objects is performed such that the difference between the boundary concentration and the internal concentration is proportional to a difference in LPI between the first and the second objects.

2. The printing method according to claim 1, further comprising: detecting the adjacent pixels as boundaries of the first and second objects if adjacent pixels of the input image data belong to the first and second objects, respectively.

3. The printing method according to claim 2, wherein the first object is a text type and the second object is a graphic type.

4. The printing method according to claim 1, wherein a concentration of at least one of the detected boundaries of the first and second objects is higher than an internal concentration of one of the first and second objects.

5. The printing method according to claim 1, further comprising: if LPIs (Lines Per Inch) of the first and second objects are equal to each other, printing the image data without performing a boundary emphasis process for the first and second objects.

6. A printing method of an image forming system, comprising:
   inputting image data to be printed;
   if adjacent first and second objects included in the input image data are halftone-processed such that the first and second objects have different halftone property, performing an emphasis process on at least one of boundaries of the first and second objects and printing the image data with an emphasized boundary; and
   wherein the halftone property comprises LPIs (Lines Per Inch);
   wherein a concentration of at least one of the detected boundaries of the first and second objects is higher than an internal concentration of one of the first and second objects;
   wherein a difference between the boundary concentration and the internal concentration of one of the first and second objects increases as a difference in LPI between the first and second objects increases.

7. A printing method of an image forming system, comprising:
   inputting image data to be printed;
   if adjacent first and second objects included in the input image data are halftone-processed such that the first and second objects have different halftone property, performing an emphasis process on at least one of boundaries of the first and second objects and printing the image data with an emphasized boundary; and
   wherein the halftone property comprises LPIs (Lines Per Inch);
   wherein a concentration of at least one of the detected boundaries of the first and second objects is higher than an internal concentration of one of the first and second objects;
   wherein a difference between the boundary concentration of one having a smaller LPI of the first and second objects and the internal concentration is larger than a difference between the boundary concentration of one having a larger LPI of the first and second objects and the internal concentration.

8. A printing method of an image forming system, comprising:
   inputting image data to be printed;
   if adjacent pixels of the input image data belong to first and second objects, respectively, detecting the adjacent pixels as boundaries of the first and second objects by comparing the LPI (Lines Per Inch) of the first and second objects;
   performing an emphasis process on the detected boundaries of at least one of the first and second objects; and
   printing the image data with emphasized boundaries;
   wherein the adjacent first and second objects is determined to have different LPIs by comparing the boundary concentration of one of the first and second objects with the internal concentration of one of the first and second objects; and
   wherein the emphasis process on at least one boundaries of the first and second objects is performed such that the difference between the boundary concentration and the internal concentration is proportional to a difference in LPI between the first and the second objects.

9. An image forming apparatus comprising:
a data input unit that receives image data to be printed;
a printing unit that prints the image data on a print medium;
a controller that, if first and second objects included in the received image data are halftone-processed such that the first and second objects have different halftone property, performs an emphasis process on at least one of boundaries of the first and second objects and controls the printing unit to print the image data with emphasized boundaries; and
wherein the halftone property comprises LPIs (Lines Per Inch);
wherein the adjacent first and second objects is determined to have different LPIs by comparing the boundary concentration of one of the first and second objects with the internal concentration of one of the first and second objects; and
wherein the emphasis process on at least one boundaries of the first and second objects is performed such that the difference between the boundary concentration and the internal concentration is proportional to a difference in LPI between the first and the second objects.

10. The image forming apparatus according to claim 9, wherein, if adjacent pixels of the received image data belong to the first and second objects, respectively, the controller detects the adjacent pixels as boundaries of the first and second objects.

11. The image forming apparatus according to claim 10, wherein the first object is a text type object and the second object is a graphic type object.

12. The image forming apparatus according to claim 9, wherein a concentration of at least one of the detected boundaries of the first and second objects is higher than an internal concentration of the first and second objects.

13. The image forming apparatus according to claim 9, wherein, if LPIs (Lines Per Inch) of the first and second objects are equal to each other, the controller controls the printing unit to print the image data without performing a boundary emphasis process for the first and second objects.

14. An image forming apparatus comprising:
a data input unit that receives image data to be printed;
a printing unit that prints the image data on a print medium;
a controller that, if first and second objects included in the received image data are halftone-processed such that the first and second objects have different halftone property, performs an emphasis process on at least one of boundaries of the first and second objects and controls the printing unit to print the image data with emphasized boundaries; and
wherein the halftone property comprises LPIs (Lines Per Inch);
wherein a concentration of at least one of the detected boundaries of the first and second objects is higher than an internal concentration of the first and second objects;
wherein a difference between the boundary concentration and the internal concentration increases as a difference in LPI (Lines Per Inch) between the first and second objects increases.

15. An image forming apparatus comprising:
a data input unit that receives image data to be printed;
a printing unit that prints the image data on a print medium;
a controller that, if first and second objects included in the received image data are halftone-processed such that the first and second objects have different halftone property, performs an emphasis process on at least one of boundaries of the first and second objects and controls the printing unit to print the image data with emphasized boundaries; and
wherein the halftone property comprises LPIs (Lines Per Inch);
wherein a concentration of at least one of the detected boundaries of the first and second objects is higher than an internal concentration of the first and second objects;
wherein a difference between the boundary concentration of one having a smaller LPI of the first and second objects and the internal concentration is larger than a difference between the boundary concentration of one having a larger LPI of the first and second objects and the internal concentration.

16. An image forming system including a host device and an image forming apparatus operable to communicate with the host device,
wherein, if first and second objects included in image data to be printed have different LPIs (Lines Per Inch), the host device performs an emphasis process on at least one of boundaries of the first and second objects and transmits the image data with the emphasized boundary to the image forming apparatus, and
wherein the image forming apparatus prints the image data transmitted from the host device;
wherein the first and second objects is determined to have different LPIs by comparing the boundary concentration of one of the first and second objects with the internal concentration of one of the first and second objects; and
wherein the emphasis process on at least one boundaries of the first and second objects is performed such that the difference between the boundary concentration and the internal concentration is proportional to a difference in LPI between the first and the second objects.

17. The image forming system according to claim 16, wherein, if adjacent pixels of the image data belong to the first and second objects, respectively, the host device detects the adjacent pixels as boundaries of the first and second objects.

18. The image forming system according to claim 16, wherein the host device performs the emphasis process on at least one of the boundaries of the first and second objects such that a concentration of the at least one of the detected boundaries of the first and second objects is higher than an internal concentration of one of the detected boundaries of the first and second objects.

19. An image forming system including a host device and an image forming apparatus operable to communicate with the host device,
wherein, if first and second objects included in image data to be printed have different LPIs (Lines Per Inch), the host device performs an emphasis process on at least one of boundaries of the first and second objects and transmits the image data with the emphasized boundary to the image forming apparatus, and
wherein the image forming apparatus prints the image data transmitted from the host device;
wherein the host device performs the emphasis process on at least one of the boundaries of the first and second objects such that a concentration of the at least one of the detected boundaries of the first and second objects is higher than an internal concentration of one of the detected boundaries of the first and second objects;
wherein the host device performs the emphasis process on at least one of the boundaries of the first and second objects such that a difference between the boundary concentration and the internal concentration increases as a difference in LPIs between the first and second objects increases.

20. An image forming system including a host device and an image forming apparatus operable to communicate with the host device,
  wherein, if first and second objects included in image data to be printed have different LPIs (Lines Per Inch), the host device performs an emphasis process on at least one of boundaries of the first and second objects and transmits the image data with the emphasized boundary to the image forming apparatus, and
  wherein the image forming apparatus prints the image data transmitted from the host device;
  wherein the host device performs the emphasis process on at least one of the boundaries of the first and second objects such that a concentration of the at least one of the detected boundaries of the first and second objects is higher than an internal concentration of one of the detected boundaries of the first and second objects;
  wherein the host device performs an emphasis process on at least one of the boundaries of the first and second objects such that a difference between the boundary concentration of one having a smaller LPI of the first and second objects and the internal concentration is larger than a difference between the boundary concentration of one having a larger LPI of the first and second objects and the internal concentration.

* * * * *